United States Patent [19]

Krstich

[11] 4,180,955
[45] Jan. 1, 1980

[54] COMPUTER CABLE SHROUD ASSEMBLY

[76] Inventor: Paul Krstich, 536 W. 47th St., New York, N.Y. 10036

[21] Appl. No.: 847,593

[22] Filed: Nov. 1, 1977

[51] Int. Cl.² .................... E04B 5/48; H01B 7/34
[52] U.S. Cl. ...................... 52/221; 52/100; 174/16 R; 361/379
[58] Field of Search ............. 52/99, 100, 221, 627, 52/588; 361/379; 174/16 R, 47; 98/40 C; 220/3.3, 3.5, 200

[56] References Cited

U.S. PATENT DOCUMENTS

| 961,720 | 6/1910 | Hubbell | 220/242 |
|---|---|---|---|
| 2,962,130 | 11/1960 | Marsi | 52/588 |
| 3,111,203 | 11/1963 | De Ridder | 52/627 X |
| 3,420,018 | 1/1969 | Fork | 52/221 |
| 3,586,915 | 6/1971 | Bell | 361/379 |
| 3,715,455 | 2/1973 | Casto | 52/221 X |
| 3,945,163 | 3/1976 | Nagler | 52/100 |
| 4,016,357 | 4/1977 | Abrahamsen | 52/126 X |

Primary Examiner—Alfred C. Perham
Attorney, Agent, or Firm—Paul J. Sutton

[57] ABSTRACT

A computer cable shroud assembly consisting of peripheral members having a cavity for receiving interlocking strips. The interlocking strips are cut out to accommodate the passage of individual cables. The computer cable shroud assembly can be assembled in the field and can be used with existing cables without having to sever or otherwise disturb the cables. A computer shroud assembly with knock-out ports can be used when it is necessary to permit and control the flow of cooling air from the under floor plenum to the above floor area.

1 Claim, 5 Drawing Figures

U.S. Patent   Jan. 1, 1980   4,180,955
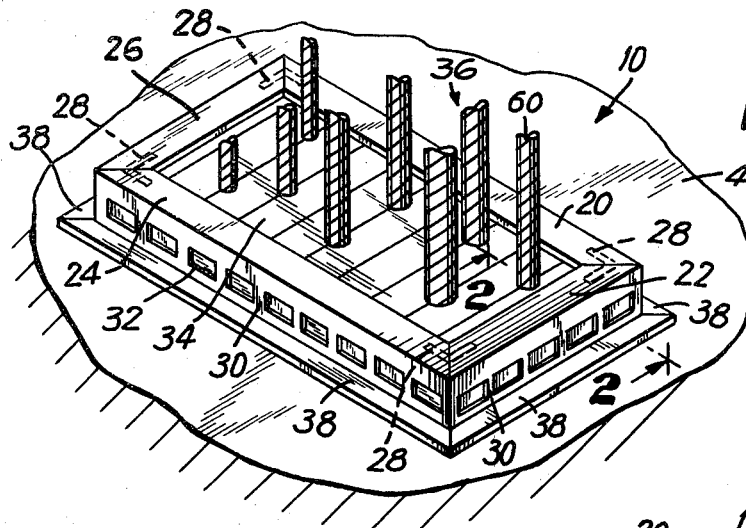

COMPUTER CABLE SHROUD ASSEMBLY

This invention relates generally to electrical cable shrouds and the like. In particular, this invention presents an improved cable shroud assembly for use with computer cables which can be easily placed in the field.

In electrical installations, cables generally pass through walls and floors and the resulting opening has to be sealed. For computer installations in particular, the cables passing through floors have to be shrouded to prevent unwanted air flow around the cables.

Let us now look at a prior art patent which, while not anticipatory of the present invention, discloses a representative example of a previously known effort to solve some of the problems associated with the art embodying this invention.

U.S. Pat. No. 3,586,916 to George Bell discloses a computer cable shroud and air diffuser unit 10 which replaces a floor tile in a computer floor. The tile unit 10 is comprised of opposed sections 22 and 24 which presumes that cables 46 can be conveniently arranged along a line defined by opposed sections 22 and 24. Sections 38 and 40 are formed of a plastic pliable material which conforms to the shape of the cables.

While I do not wish to minimize the inventiveness and efforts of the inventor of the foregoing patent and while he is attempting to solve a problem solved by the present invention it may be worthwhile commenting on the methods used.

There are times when it is not desirable or necessary to replace a complete floor tile. Further, it is not always convenient or possible to arrange a cable group in a single plane as the cable group passes through the computer floor. The ribbon shroud which encloses the cables is made of a plastic pliable material which is left to harden in place. While the plastic material hardens it must be supported so as to resist the tendency of the cables to return to their original positions.

The present invention concerns itself with a computer cable shroud. However, I wish to emphasize here that the present invention may be equally suited for other applications requiring cable shrouds.

Accordingly, it is an object of the present invention to provide a cable shroud which can be used in place of a computer floor tile or can be used in combination with a computer floor tile to prevent undesirable air flow through the cable openings in the computer floor.

Another object of this invention is to provide lateral interlocking strips which can be easily cut-out to accommodate the passage of cables.

Yet another object of this invention is to provide for a cable shroud which can be easily placed around existing computer cable installations.

A further object of this invention is to permit field construction of a cable shroud using precut sections fastened at each corner by a corner connector.

Still another object of this invention is the use of double-faced adhesive tape to fasten the cable shroud to the computer floor.

Still yet another object of this invention is the use of reinsertable knock-out ports to control the flow of air between the under-floor area and the above-floor area.

A still further object of this invention is to provide a cable shroud wherein the interlocking strips can be easily replaced to accommodate a change in the number of cables passing through the shroud.

My invention will be made more clearly understood from the following description of specific embodiments of the invention, together with the accompanying drawings, wherein similar reference characters denote similar elements throughout the several views, and in which:

FIG. 1 is a perspective view of a computer cable shroud with knock-out ports;

FIG. 2 is section 2—2 of FIG. 1;

FIG. 3 is a plan view of a computer shroud without knock-out ports;

FIG. 4 is section 4—4 of FIG. 3;

FIG. 5 is a perspective view of a corner connector.

Referring to FIG. 1, a novel computer cable shroud assembly with knock-out ports 10 is illustrated.

Computer cable shroud assembly with pop-out ports 10 is comprised of a first peripheral section 20 adjoining a second peripheral section 22. Adjoining portions of section 20 and section 22 are interlocked by a corner connector 28. Similarly, a third peripheral section 24 adjoins second peripheral section 22 and is interlocked by corner connector 28. Third peripheral section 24 adjoins a fourth peripheral section 26 and the adjoining portions are interlocked by corner connector 28. To complete the rectangular structure fourth peripheral section 26 adjoins first peripheral section 20 and the two adjoining sections are interlocked by corner connector 28.

Each peripheral section 20, 22, 24 and 26 has on a vertical face 30 a multiplicity of predetermined deformations 32. Supported by the rectangular structure formed from peripheral sections 20, 22, 24 and 26 are a multiplicity of interlocking strips 34. The multiplicity of interlocking strips 34 is shown accommodating a cable group 36. A lower flange 38, part of each peripheral section 20, 22, 24 and 26, adjoins the top surface of a floor tile 40 which has an opening of predetermined dimensions.

FIG. 2 shows a section 2—2 generally designated 12. Section 2—2, 12 illustrates in detail peripheral section 20 and peripheral section 22. Also illustrated is typical deformation 32 and partially sheared a knock-out port 42, a part of peripheral section 22. Also shown are several knock-out ports 42 which are part of peripheral section 20.

Integral with peripheral section 22 is a cavity formed from an outer horizontal member 44, an inner horizontal member 46 and portion of vertical face 30. Lower flange 38 is made integral with floor tile 40 by means of double-faced adhesive tape 48 thereby sealing the opening of predetermined dimensions in floor tile 40. Several interlocking strips 34 are shown together with interlocking details.

Each interlocking strip 34 has a first flange 50 depending from a first longitudinal edge 52. Flange 50 is of a predetermined length, said length being determined by the dimension between outer horizontal member 44 and inner horizontal member 46. Depending from a second longitudinal edge 54 is a second flange 56 having an L-shaped member 58 integral with the end of flange 56 which is remote from second longitudinal edge 54.

First flange 50 and second flange 56 having L-shaped member 58 integral are of predetermined dimensions which insure interlocking of adjacent interlocking strips 34.

A cable 60 is shown passing through an opening 62 made where first longitudinal edge 52 and second longitudinal edge 54 are contiguous.

FIG. 3, generally designated 14, shows a partial plan view of a computer cable shroud assembly.

A fifth peripheral section 64 adjoins a sixth peripheral section 66, the two sections being locked together with corner connector 28. Shown also are interlocking strips 34. The computer cable shroud assembly 14 is shown as made integral with floor tile 40.

FIG. 4 illustrates a section 4—4 generally designated 16. Shown is floor tile 40 having predetermined a tile opening 76. Fitting within tile opening 76 is an assembly formed of fifth peripheral section 64 and a seventh peripheral section 67.

Fifth peripheral section 64 comprises a vertical member 74 having integral an upper flange extension 72 and an upper flange 68. A predetermined distance from upper flange 68 is a flange member 70, flange member 70 is made integral with vertical member 74. The distance between upper flange 68 and flange member 70 is predetermined by first flange 50 which is part of interlocking strips 34. Second flange 56 has been described in a foregoing paragraph. Vertical member 74 has an opening therein for receiving corner connector 28 and upper flange extension 72 is made integral with floor tile 40 by means of double-faced adhesive tape 48.

FIG. 5 shows corner connector 28 and is generally designated 18. Notch 78 is formed at the mid-point of corner connector 28 which is shown in the dashed position before bending. Notch 78 insures that corner connector 28 bends in the manner shown by the full line drawing of corner connector 28.

In FIG. 1 cable group 36 is shown passing through openings in a barrier formed by interlocking strips 34. For example, cable 60 passes through an opening formed by contiguous interlocking strips 34. Location of openings in the aforesaid manner enables interlocking strips 34 to be placed without disturbing cable group 36. Interlocking strips 34 are held captive through use of a structure formed by peripheral sections 20, 22, 24 and 26 made integral at adjoining points by corner connector 28.

Peripheral sections 20, 22, 24 and 26 contain deformations 36. Each deformation 32 has integral a knock-out port 42. Knock-out port 42 can be easily removed to uncover an opening at each deformation 32. Knock-out port 42 can also be reinserted in deformation 32 to close an opening. The ability to remove or reinsert knock-out ports 42 enables control of air flowing from below the floor to the area above the floor. The control thus achieved permits controlling the cooling air delivered to various parts of a computer.

FIG. 2 which is section 2—2 of FIG. 1 shows the details of opening 62 for cable 60. Ideally, the axial center line of cable 60 coincides with the line formed by contiguous longitudinal edges 52 and 54 of interlocking strips 34. Details of the manner whereby interlocking strips 34 lock is shown as first flange 50 nests in a pocket formed by second flange 56 together with L-shaped member 58. Interlocking strips 34 are held captive between outer horizontal member 44 and inner horizontal member 46 thereby restraining cable group 36.

Computer cable shroud assembly with pop-out ports 10 is assembled over the opening in tile 40 and lower flange 38 is made integral with tile 40 by interposing double-faced adhesive tape 48 thereby preventing unwanted flow of cooling air at this point.

Computer installations may require that cable routing be changed or cables added and subtracted. Under the foregoing conditions new cable can be accommodated by using new replaceable interlocking strips 34.

The plan view FIG. 3 shows a cable shroud assembly without pop-out ports.

The constructional details of computer cable shroud assembly 14 will be easily seen in FIG. 4 where fifth peripheral section 64 and seventh peripheral section 67 is shown. Upper flange 68 and flange member 70 shows how interlocking strips 34 are held captive. Vertical member 74 fits within tile opening 76 of floor tile 40. Computer cable shroud assembly 14 is made integral with floor tile 40 by means of double-faced adhesive tape 48.

Corner connector 28 is shown in the developed and formed positions in FIG. 5. Notch 78 insures that corner connector 28 will bend at a predetermined position.

A number of observations concerning the present invention are important stating or restating here in an effort to give the reader an appreciation of novel features of this invention. More specifically, it is important to emphasize that the structures disclosed in FIGS. 1, 2, 3 and 4 may be used either with or without cables or cable groupings, as suggested in FIGS. 1 and 2, for example. As an example, should there be an opening or a hole in the floor, the present invention, more specifically that shown in FIGS. 3 and 4, may be used to cover this opening and, because of the flush feature of flange 72 lying next to or substantially flush with floor tile 40, this installation according to the present invention will take the weight of the parties walking on it. It is important here to appreciate that one need not use the embodiment of the present invention disclosed in FIGS. 1 and 2 which stands upright from the floor, but in many applications a more important embodiment of this invention—that shown in FIGS. 3 and 4—will be useful in providing an installation that is substantially flush with the floor and capable of being walked upon.

Another item worth mentioning here resides in the fact that when cables are utilized, they often contain spatial areas between the cables which present a path for cool or airconditioned air to be tossed through. The greater the number of cables being clustered or grouped together the greater will be the amount of spatial areas through which this air loss will occur. In the present invention, each and every cable is individually encircled, thus providing nearly 100% efficiency.

In the embodiment of the present invention disclosed in FIGS. 3 and 4, even in installations where there is no airconditioning or cooled air required, but instead where a cable cutout must now be sealed where the cable is no longer passing through the floor, the present invention provides a ceiling device which affords safety by providing a flush installation which will prevent employees from tripping or falling as they might otherwise do if the open cable opening remains. Where airconditioning is required and the air must be retained, this installation will further provide a seal for the air.

It is also important here to emphasize that in instances where a cable cutout opening is straddled by a computer or other piece of equipment, such as in the case of the cutout being only half covered and half exposed, the present invention as described and disclosed in FIGS. 3 and 4 enable the entire opening to be sealed. My invention can be assembled to lie substantially parallel to the floating floor with approximately $\frac{1}{8}''$ clearance in height, thereby enabling its installation under computers or other equipment which have a greater clearance beneath them in cases where they are supported by adjustable corner jacks or feet. In instances where equipment is moved to other areas on the floor or in other rooms, the remaining cutout openings may be sealed by use of the flush installation described herein and disclosed in FIGS. 3 and 4. It goes without saying that by sealing these open cutouts or openings, energy loss is kept at a minimum.

The embodiments of the invention particularly disclosed and described hereinabove are presented merely as examples of the invention. Other embodiments, forms and modifications of the invention coming within the proper scope and spirit of the appended claims will, of course, readily suggest themselves to those skilled in the art.

What is claimed is:

1. A computer cable shroud assembly comprising: a peripheral frame assembly formed adjacent an opening overlying a portion of flooring, a plurality of removable and replaceable strip members disposed adjacent the frame assembly and over said flooring, said strip members each capable of having an edge portion thereof severed to provide an aperture between adjacent strip members through which a cable may be located, said strip members comprising a plurality of mutually interlocking and replaceable modular strips formed with substantially and generally planar upper surfaces adapted to carry predetermined weight, each said strip including mating edge portions having a configuration capable of being engaged by and removably interlocked with an edge portion of an adjacent strip, said edge portions being capable of deformation and predetermined severance by the user to provide a resulting port able to accommodate a substantially vertically extending cable therethrough.

* * * * *